(12) United States Patent
Kroes

(10) Patent No.: US 9,696,197 B1
(45) Date of Patent: Jul. 4, 2017

(54) AUTOMATIC SURFACE ELEVATION TABLE (AUTO SET)

(71) Applicant: Daniel E. Kroes, Baton Rouge, LA (US)

(72) Inventor: Daniel E. Kroes, Baton Rouge, LA (US)

(73) Assignee: The United States of America as Represented by the Secretary of the Department of the Interior, Washington, DC (US)

( * ) Notice: Subject to any disclaimer, the term of this patent is extended or adjusted under 35 U.S.C. 154(b) by 413 days.

(21) Appl. No.: 14/514,004

(22) Filed: Oct. 14, 2014

Related U.S. Application Data

(60) Provisional application No. 61/899,778, filed on Nov. 4, 2013.

(51) Int. Cl.
*G01F 23/30* (2006.01)
*G01F 23/66* (2006.01)

(52) U.S. Cl.
CPC .................................. *G01F 23/66* (2013.01)

(58) Field of Classification Search
CPC ..................................................... G01F 23/66
USPC ........................................................ 73/312
See application file for complete search history.

(56) References Cited

U.S. PATENT DOCUMENTS

| | | | | | |
|---|---|---|---|---|---|
| 3,650,591 | A | * | 3/1972 | Longmire, Sr. | A47B 51/00 186/51 |
| 3,691,839 | A | * | 9/1972 | Lasher | G01F 23/76 116/228 |
| 4,563,896 | A | * | 1/1986 | Arnold | G01F 23/0023 73/290 R |
| 4,715,966 | A | * | 12/1987 | Bowman | C02F 3/006 210/532.2 |
| 7,596,999 | B1 | * | 10/2009 | Vitarelli | G01F 23/58 73/319 |

OTHER PUBLICATIONS

USGS SET website—Design: Rod SET; https://www.pwrc.usgs.gov/set/set/rod.html; Jun. 23, 2010; whole document.*

(Continued)

*Primary Examiner* — John Fitzgerald
*Assistant Examiner* — Rodney T Frank
(74) *Attorney, Agent, or Firm* — James M Mitchell

(57) ABSTRACT

An automatic surface elevation table (Auto SET) for measuring ground surface movements and land surface subsidence. The Auto SET includes a free-floating foot resting on a sediment surface. A benchmark rod passes through a center of the free-floating foot, and is driven into the sediment surface and extends above the sediment surface. A water level recorder system is attached to the benchmark rod. The water level recorder system includes a water level recorder attached to a top of the benchmark rod, a double block pulley system having an upper end connected to the water level recorder and a lower end connected to the free-floating foot, and a counterweight attached to the upper end of the double block pulley system. The water level recorder system measures movement of the free-floating foot to determine ground surface movements.

20 Claims, 9 Drawing Sheets

(56) References Cited

OTHER PUBLICATIONS

Boumans, R. M. J. & Day, J. W. High precision measurements of sediment elevation in shallow coastal areas using a sedimentation-erosion table. Estuaries 16, 375-380 (1993).

Cahoon, D. R., J. W. Day, Jr., and D. J. Reed. 1999. The influence of surface and shallow subsurface soil processes on wetland elevation: a synthesis. Current Topics in Wetland Biogeochemistry 3:72-88.

Cahoon DR, Lynch J.C, Hensel P, Boumans R, Perez BC, Segura B, Day Jr JW. 2002a. High-precision measurements of wetland sediment elevation: I. Recent improvements to the sedimentation-erosion table. J Sed Res 72:730-733.

* cited by examiner

AUTOMATIC SURFACE ELEVATION TABLE (AUTO SET)

CROSS-REFERENCE TO RELATED APPLICATION(S)

This application is related to and claims the benefit of priority to U.S. Provisional Application Ser. No. 61/899,778 filed Nov. 4, 2013 in the U.S. Patent and Trademark Office, the contents of which are incorporated herein by reference.

STATEMENT OF GOVERNMENT INTEREST

The invention described herein may be manufactured, used, and licensed by or for the U.S. Government for governmental purposes without payment of any royalties thereon.

BACKGROUND

The present invention relates in general to measurement of ground surface movements and land surface subsidence.

River floodplains are some of the most dynamic surfaces of our landscape. In the normal course of a year, the sediment surface can be flooded by several meters of water for months and then crack when the water recedes and the sediment dries. Over time, deposited sediments decompose, dewater, and compact resulting in subsidence that is sometimes offset by subsequent deposition. In situations where deposition does not occur, net elevation loss results. Historically, shallow subsidence (<30 m) has been measured with Surface Elevation Tables (SETs) 100 (Cahoon et. al, 1999), such as the manual rod SET (rSET) illustrated in FIG. 1. The distance between a reader arm 102 and a land surface 104 is measured repeatedly over time and is compared with deposition in the area to determine subsidence rates and net elevation loss or gain.

The inventor has used rSETs in riparian environments and has observed large (greater than 10 mm) surface elevation variations during rSET measurement. The observed variations were assumed to have resulted from rainfall and changes in river stage, but periodic measurements from the rSETs were inadequate to fully understand what had occurred (Kroes and Hupp 2010). As illustrated in FIG. 2, in most cases, polyvinyl chloride (PVC) sleeves 202 and marker pipes 204 associated with the SETs and other sediment monitoring locations showed dark, organic staining 206 of the upper sections and pure white lower sections 208. In one observation, the distance from the sleeve 202 at ground level 210 to the top of the white portion 208 was about 100 mm. These marks were assumed by the inventor to be from the unconsolidated sediment's shrink and swell, that is, from sediment swelling during high water that covered the sleeve 202 and prevented organic rich water from coming into direct contact. Strict conformity of environmental conditions were observed in order to minimize these variations. Close attention was paid to river stage, rainfall, and the time of year. The SETs were read during low flow, no rain for a week, and just before the leaves fell in autumn, and still had unexplained inconsistencies in surface levels. The inventor has observed that traditional rSETs located in the Atchafalaya River Basin in Louisiana have measured rates of subsidence ranging from 2.3 mm/yr to 25 mm/yr and deposition ranging from 6 to 14 mm/yr during 2010-2012.

Measurement of shallow subsidence in a river floodplain has been problematic with relatively large measurement errors if a very specific set of conditions were not closely followed. Often years of data were unusable due to what appeared to be a change in the hydration state of the floodplain. The large range in water levels on a floodplain and the typical lack of usable well casings made dry land extensiometers useless. Thus, an improvement is needed in measuring shallow land surface subsidence.

SUMMARY

An automatic surface elevation table (Auto SET) is described herein that measures shallow land surface subsidence. It measures the movement of the ground surface around a benchmark rod automatically over time. The Auto SET records the movement of the land surface in a way that allows the user to compensate for and remove unwanted surface movements. In areas prone to changes in soil moisture, it measures the shrink and swell movement of the ground surface at time intervals in order to more accurately determine subsidence rates.

The Auto SET allows for precise measurements of ground surface movements in an automated fashion using a water level recorder system that is a modified float and counterweight shaft potentiometer. The water level recorder system is free-floating on the shrouded benchmark rod. Instead of using a float, however, one end of the water level recorder system is attached to an aluminum foot that is neutral in weight to the sediment density. Surface movements are mechanically advantaged at a ratio of 5:1 through a block and pulley system.

In accordance with an embodiment of the invention, there is provided an automatic surface elevation table (Auto SET) for measuring ground surface movements. The Auto SET includes a free-floating foot resting on a sediment surface. A benchmark rod passes through a center of the free-floating foot, and is driven into the sediment surface and extends above the sediment surface. A water level recorder system is attached to the benchmark rod. The water level recorder system includes a water level recorder attached to a top of the benchmark rod, a double block pulley system having an upper end connected to the water level recorder and a lower end connected to the free-floating foot, and a counterweight attached to the upper end of the double block pulley system. The water level recorder system measures movement of the free-floating foot to determine ground surface movements.

In accordance with another embodiment of the invention, there is provided a method for measuring ground surface movements using an automatic surface elevation table. The method includes placing a free-floating foot on a sediment surface and passing a benchmark rod through a center of the free-floating foot. The benchmark rod is driven into the sediment surface, and an upper part of the benchmark rod extends above the sediment surface. A water level recorder system is attached to a top of the benchmark rod and to the free-floating foot. Movement of the free-floating foot is measured using the water level recorder system to determine ground surface movements.

BRIEF DESCRIPTION OF THE DRAWINGS

Various aspects and advantages of the invention will become apparent from the following detailed description, taken in conjunction with the accompanying drawings. The drawings are not necessarily drawn to scale. In the drawings.

DETAILED DESCRIPTION OF THE PREFERRED EMBODIMENTS

Figure 1:
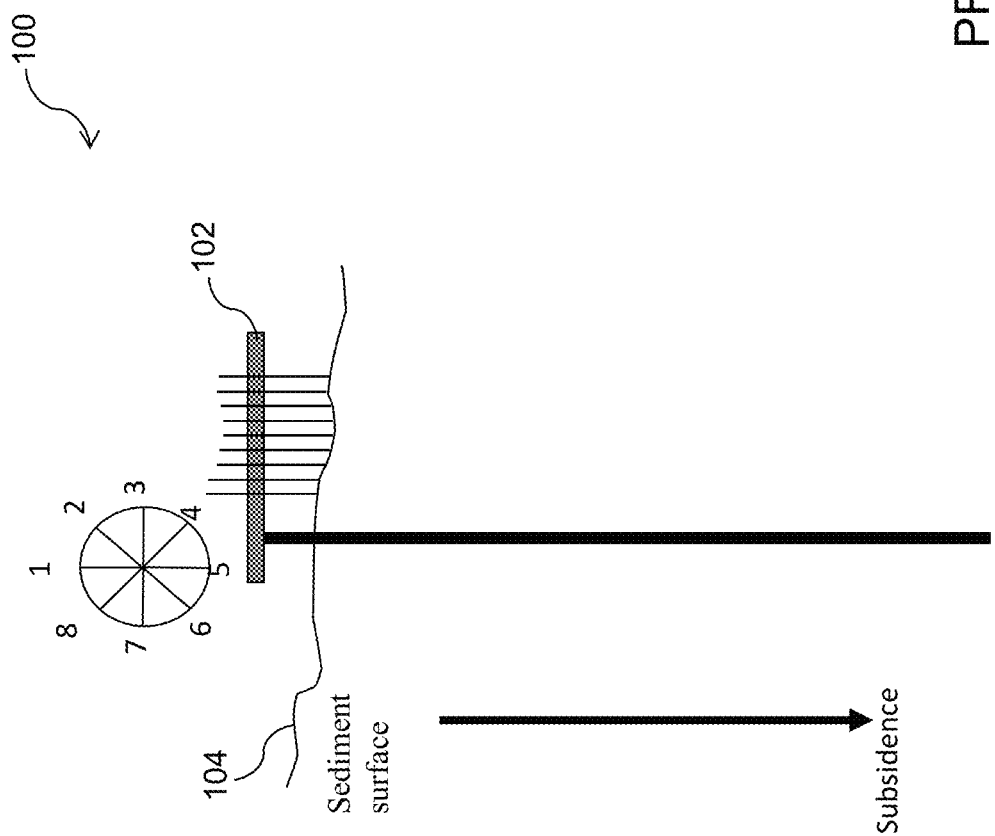
FIG. 1 illustrates a manual rod surface elevation table.
Figure 2:
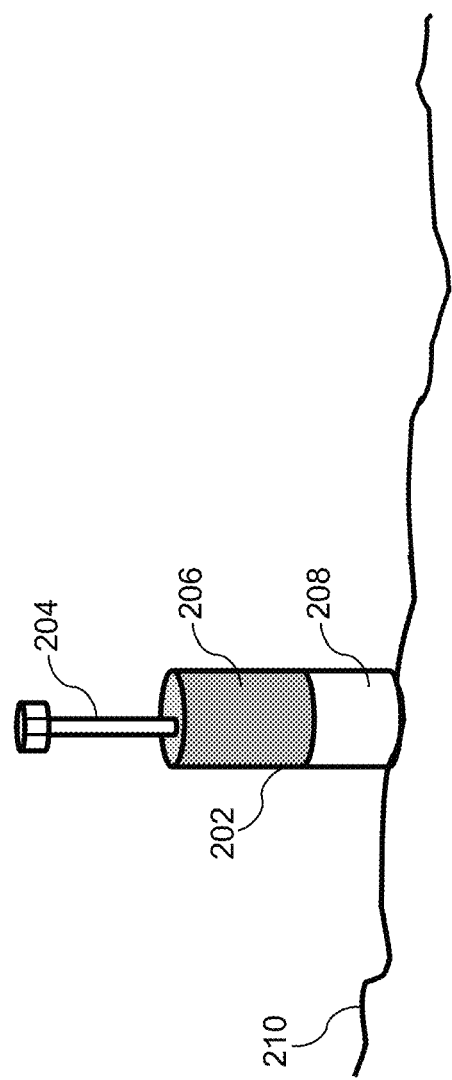
FIG. 2 illustrates staining of a PVC sleeve around a manual rod surface elevation table pipe.
Figure 3:
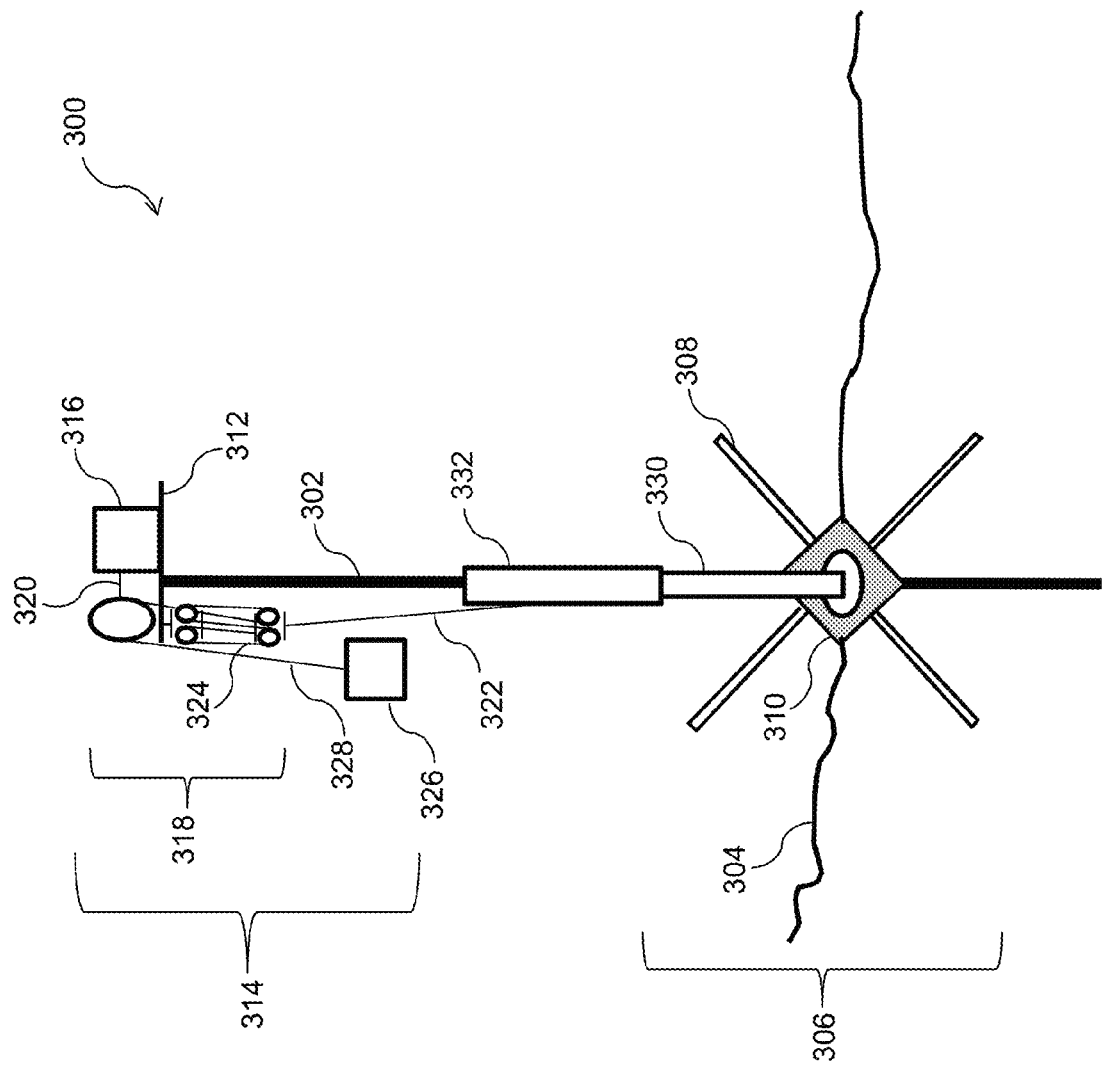
FIG. 3 illustrates an automatic surface elevation table (Auto SET) according to an embodiment of the invention.

An automatic surface elevation table (Auto SET) 300 shown in FIG. 3 provides needed improvement in measuring shallow land surface subsidence. The Auto Set 300 has a benchmark rod 302 made of stainless steel that is driven to refusal, for example, 13 m below a sediment surface 304, and extends above the sediment surface 304 to above a normal flood stage. The benchmark rod 302 has a typical length of 16 m, which may vary depending upon the particular area being studied.

The benchmark rod 302 passes through the center of a free-floating foot 306. In one embodiment of the invention, the foot 306 is constructed from 1 m by 2.5 cm aluminum angle bar 308 of 3 mm thickness forming an X-shape with a 20 cm square aluminum center 310. The surface area of the foot 306 is 0.06 m$^2$. The foot 306 rests on the sediment surface 304 and exerts an effective downward pressure of about 1 g/cm$^2$ on the sediment surface 304, and it is buried by 1 cm of onsite sediment to prevent lifting by water or animals. The foot 306 may have other sizes and shapes (e.g., solid square, triangular, and circular).

A top of the benchmark rod 302 has a platform 312 on which is fitted a water level recorder system 314. The water level recorder system 314 is a "geared-up" or modified float and counterweight-type shaft potentiometer water level recorder system. Rather than using a float, however, the foot 306 is used instead. The water level recorder system 314 has a water level recorder 316 that is attached to a double block pulley system 318 by a stainless steel beaded cable 320. A lower end of the double block pulley system 318 is attached to the foot 306 using another stainless steel beaded cable 322. The cable 322 is attached near the center of the square aluminum plate 310. The double block pulley system 318 uses a line 324 that is 1.8 mm dyneema braid, 386 kg tensile strength, 0.2% stretch. A 230 g counterweight 326 is attached to the double block pulley system 318 using stainless steel beaded cable 328. The counterweight 326 exerts 1.15 kg of lift on the foot 306. The free-floating water level recorder system 314 is attached only to the benchmark rod 302 and measures the movement of the foot 306, whose only contact points are the sediment surface 304 and the cable 322.

A typical float and counterweight shaft potentiometer water level recorder is sensitive to movement of about 0.2 mm. However, the double block pulley system 318 operates as a motion multiplier (5×) to increase the sensitivity of movement of the Auto SET 300 to about 0.04 mm. Through the double block pulley system 318, surface movements are mechanically advantaged at a ratio of 5:1. Other pulley systems may be used to provide desired gear ratios.

Figure 4:
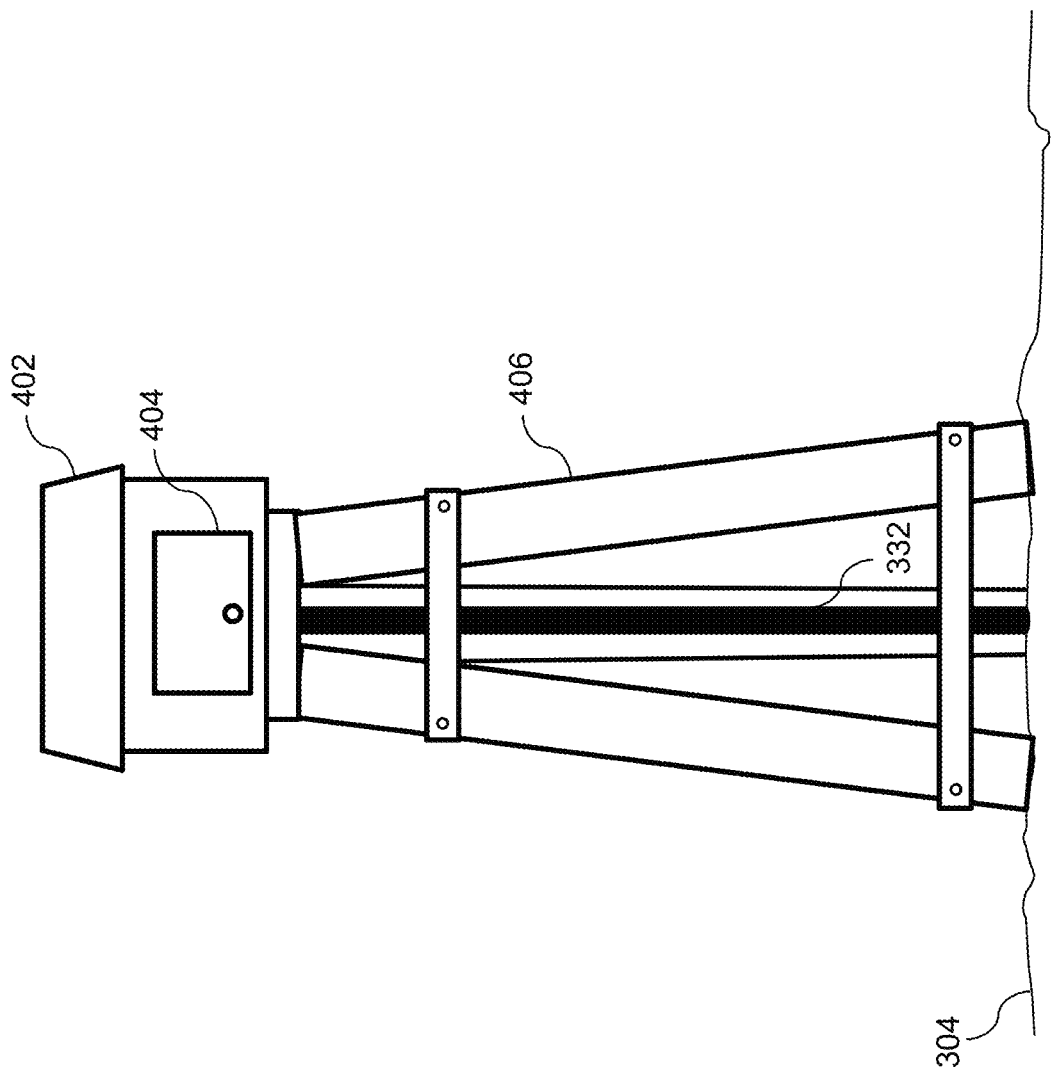
FIG. 4 illustrates a housing and support structure for the Auto SET of FIG. 3.

All parts of the Auto SET 300 involved with measurement are shielded from direct sunlight and vented in order to minimize heat expansion issues. The benchmark rod 302 is covered by a vented lower sleeve or shroud 330, which is enclosed within a vented upper sleeve or shroud 332. Referring to FIG. 4, the water level recorder system 314 may be enclosed within a housing structure 402 with a door 404 for easy access. Also, the Auto SET 300 may be framed within a supporting and protective structure 406 that supports the water level recorder system 314 and its housing 402 and stabilizes the benchmark rod 302.

In another embodiment of the invention, a direct cable rather than the motion multiplier (i.e., the 5× double block pulley system 318) is used because of the large range in surface level. In many situations, the individuals investigating subsidence are not interested in the small movements during daily cycles, but are interested in the yearly gross movement of the land surface. In those circumstances, the motion multiplier 318 would provide unnecessary resolution of ground surface movement, and the 0.2 mm resolution of movement by the typical shaft potentiometer water level recorder would be sufficient.

EXAMPLE 1

An example will now be described in detail below that serves to illustrate the preparation and testing of an illustrative embodiment. However, it will be understood that the present invention is in no way limited to the example set forth below.

During June 2012, three Auto SETs were installed in the Atchafalaya River Basin in Louisiana (Bayou Darby, Bayou Pigeon, and Buffalo Cove) to collect hourly surface elevations. They are co-located with previously installed traditional, manual rSETs and temperature, barometric pressure, and groundwater/surface water sensors in order to better understand the causes of variability in surface elevation. The auto SETs were deployed in an isolated cypress backswamp, a willow flat, and a cypress-tupelo swamp.

Groundwater monitoring wells were dug at each location to a depth of approximately −1 m NAVD 88 (North American Vertical Datum of 1988). Wells were cased with 5 cm diameter slotted PVC and screened with a fine plastic fabric. Water level and water temperature were monitored with an unvented pressure transducer that was lowered to the bottom of the well. Barometric pressure corrections and air temperature were recorded with another unvented pressure transducer that was located within the equipment box at the top of the structure. During the low water common during the summer, surface water levels were monitored by the closest U.S. Geological Survey/U.S. Army Corps of Engineers gage station (Ser. No. 07/381,567 (Buffalo Cove at Round Island near Charenton, La.), 073815963 (Murphy Lake near Bayou Sorrel, La.), 300507091355600 (Bayou Darby near Lake Fausse Point Cut), USACE 49630 (Bayou Sorrel Lock)). Rainfall events were derived from RADAR archives (Wunderground 2012, http://www.wunderground.com/wundermap).

Figure 5A:
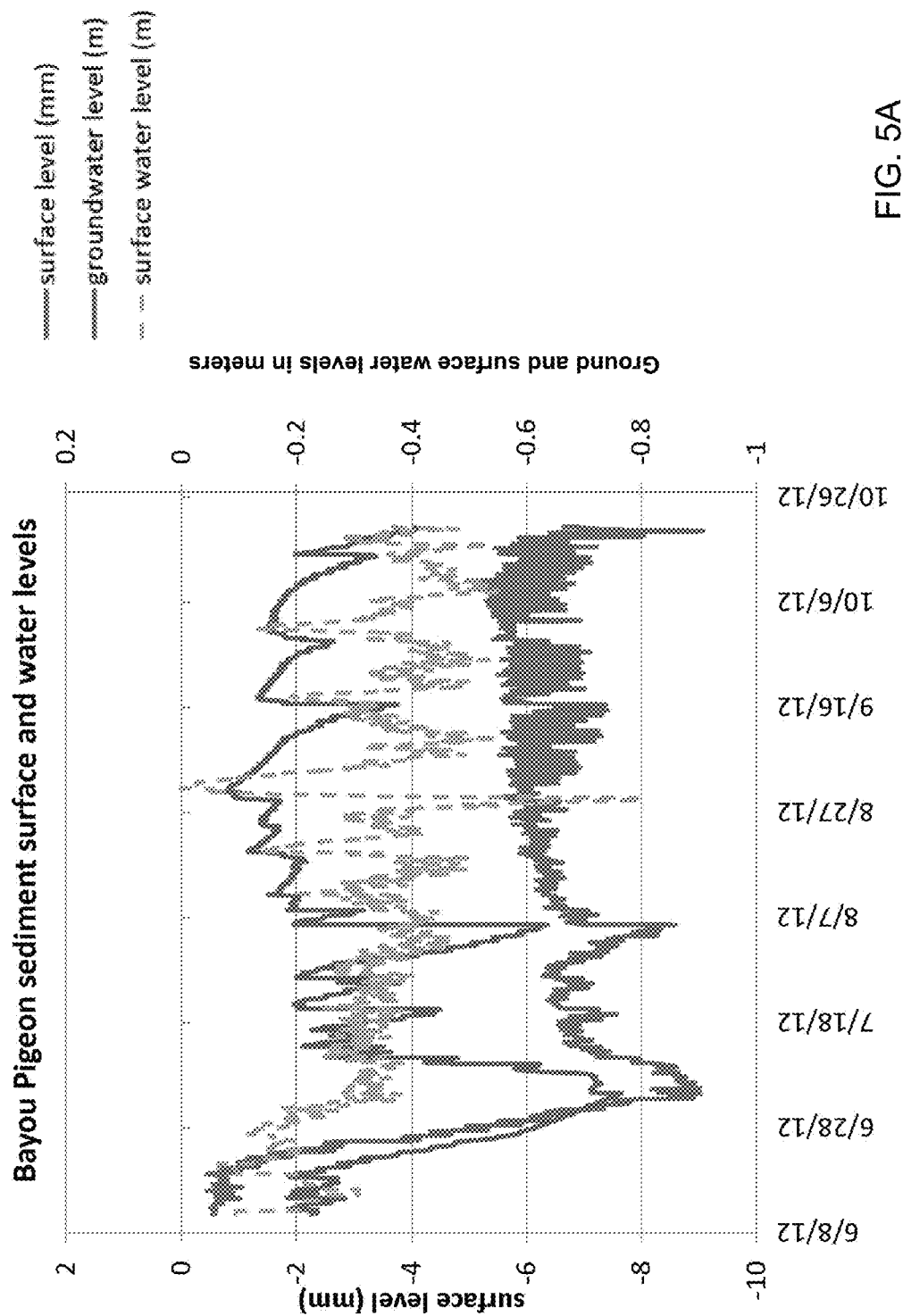
FIG. 5A is a chart of Bayou Pigeon (Louisiana) sediment surface levels as recorded by the Auto SET of FIG. 3 and water levels recorded by other instrumentation.
Figure 5B:
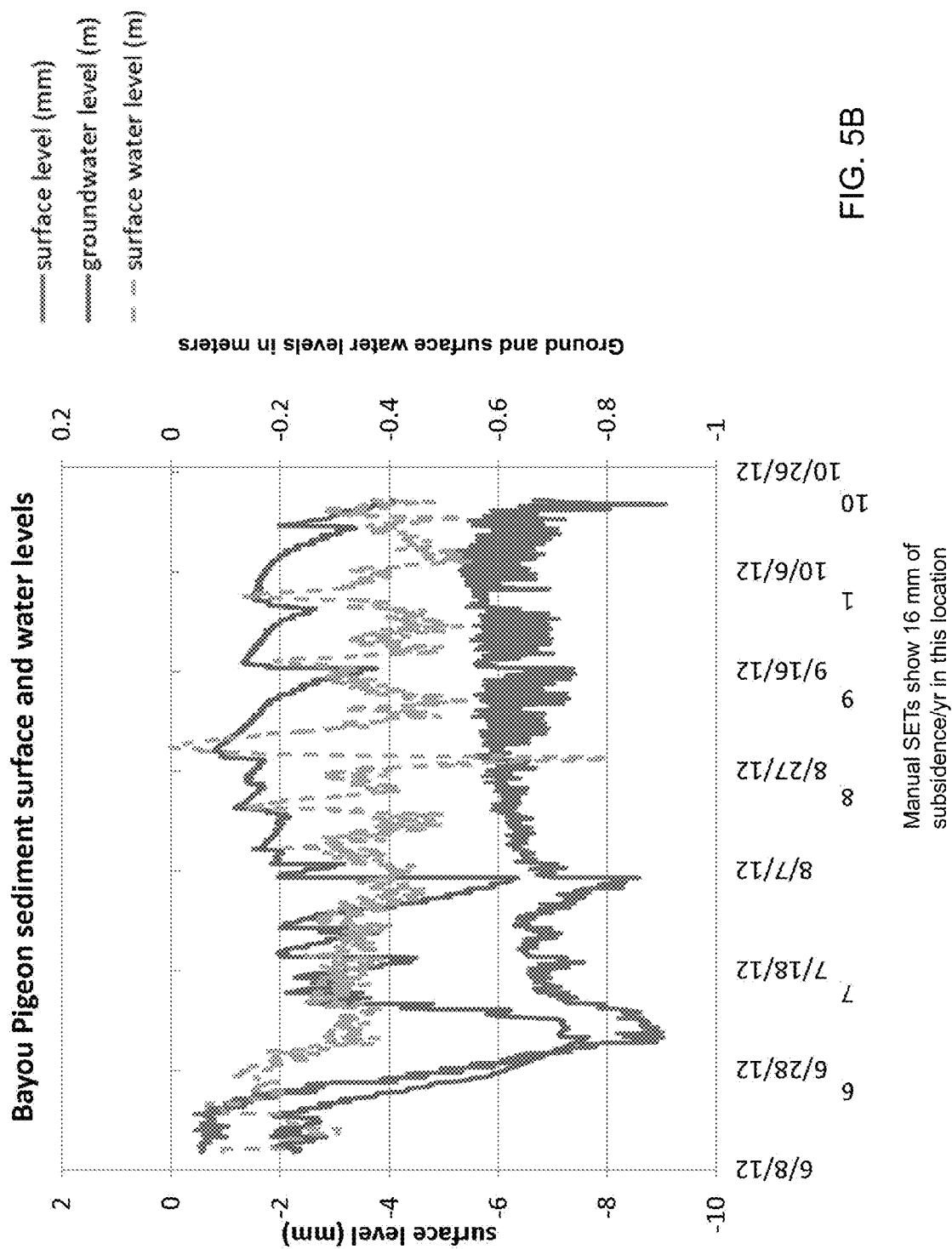
FIG. 5B is a chart of Buffalo Cove (Louisiana) sediment surface levels as recorded by the Auto SET of FIG. 3 and water levels recorded by other instrumentation.
Figure 5C:
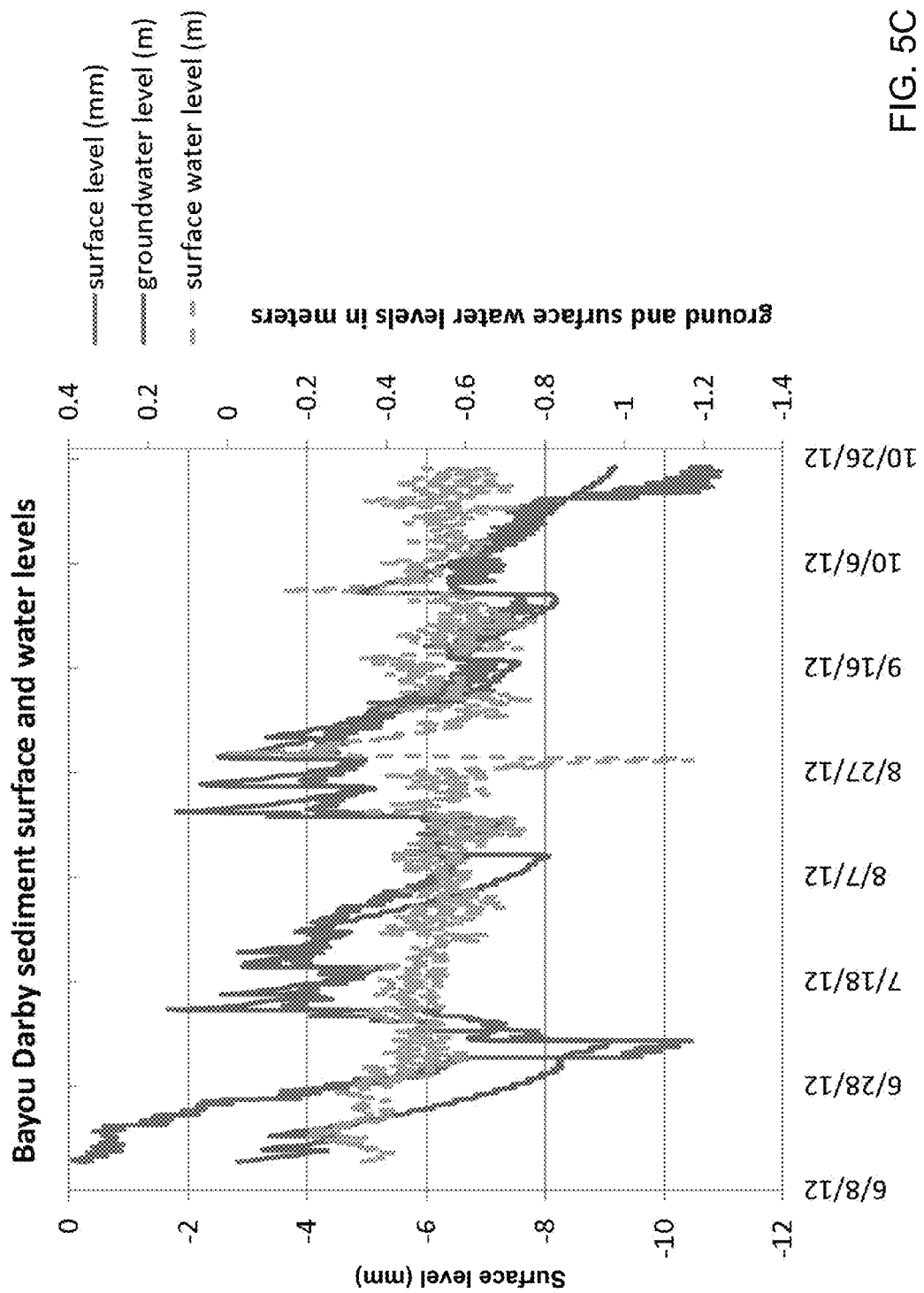
FIG. 5C is a chart of Bayou Darby (Louisiana) sediment surface levels as recorded by the Auto SET of FIG. 3 and water levels recorded by other instrumentation.
Figure 5D:
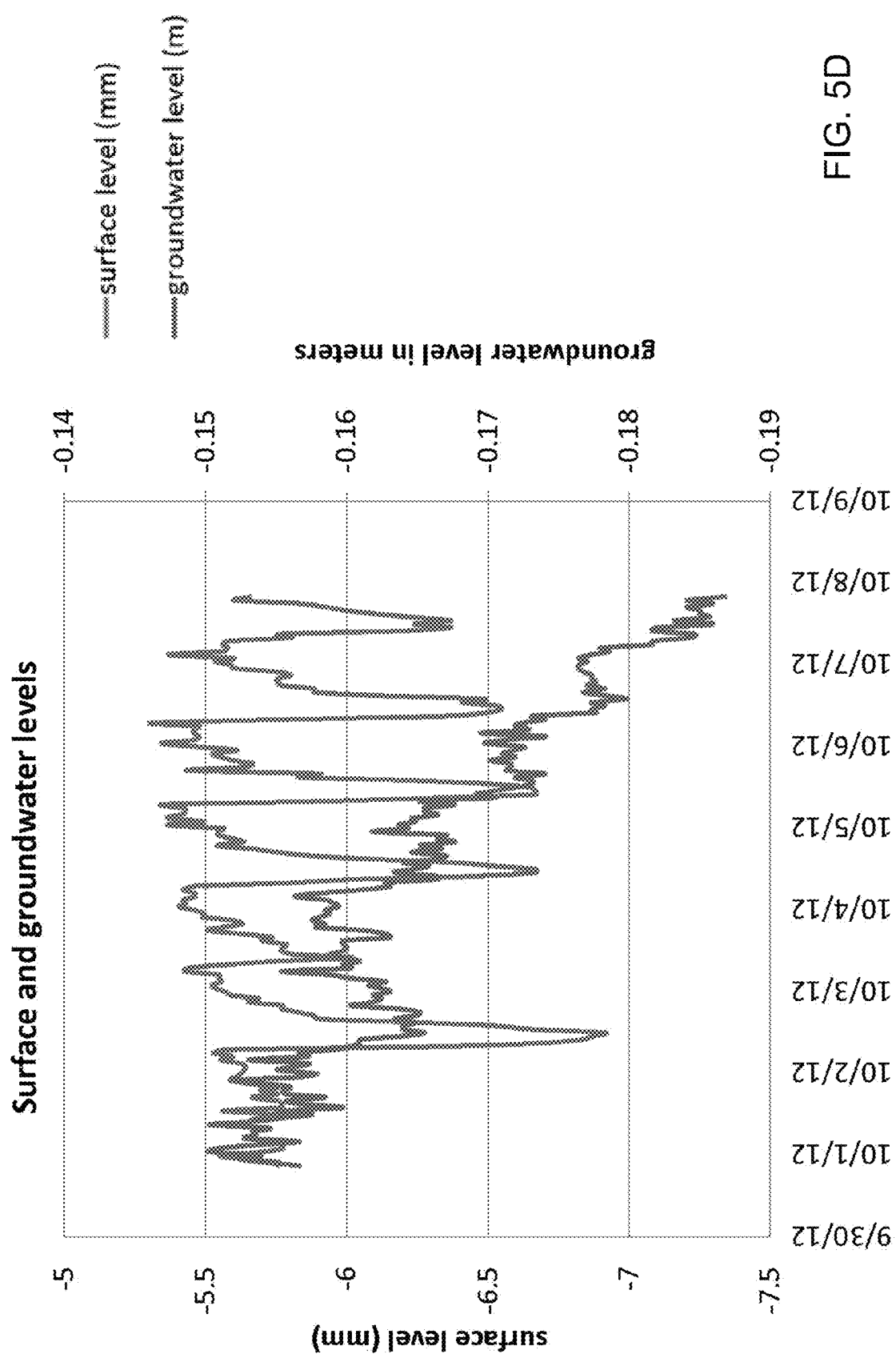
FIG. 5D is a chart of surface and groundwater levels for Bayou Darby.
Figure 5E:
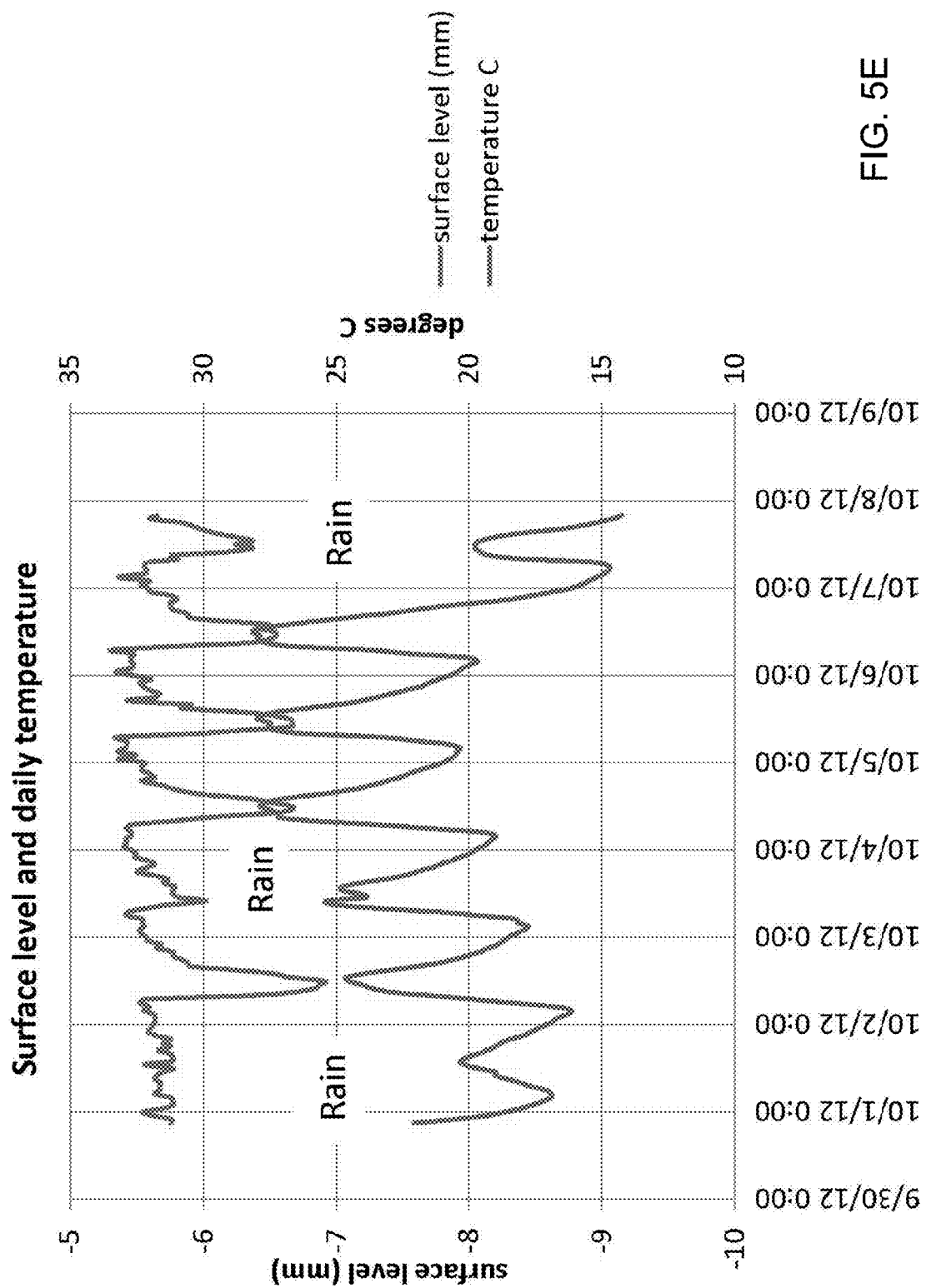
FIG. 5E is a chart of surface level and daily temperature for Bayou Darby.

The Auto SETs were in operation until late October 2012. During this time, water levels in the Atchafalaya River were at decadal low levels. Despite the small range in surface water and groundwater levels, the sediment surface moved average range of 13 mm downward and upward. Surface levels declined as groundwater levels declined and increased as groundwater levels increased at these lower river stages, as shown in FIGS. 5A, 5B, and 5C. FIGS. 5A to 5C illustrate sediment surface levels (recorded by the Auto SET 300) and water levels (recorded by the gage stations) for Bayou Pigeon, Buffalo Cove, and Bayou Darby, respectively. In a time frame of one week, the inventor observed daily cycling of surface levels. Surface levels decreased as groundwater levels decreased, as shown by the chart of surface and groundwater levels for Bayou Darby in FIG. 5D. The amount of groundwater rebound did not rebound an equivalent percentage as surface level over this short time frame. In the short time frame, the sediment surface cycles inversely with air temperature, and rainfall interrupts the cycle momentarily, as shown by the chart of surface level and daily temperatures for Bayou Darby in FIG. 5E. The three sites showed some differences in range of movement and rebound; however, the overall trends of motion were very similar.

The surface level movements recorded by the Auto SET 300 (see FIGS. 5A to 5E) indicate that in order for surface movement to be understood and properly measured, high accuracy measurements need to be made at short time intervals. In the embodiment shown in FIG. 3 with the 5:1 motion multiplier 318, the Auto SET 300 is able to measure changes in surface level within a single day in response to changes in the environment (see FIGS. 5D and 5E).

The apparatus described herein provides several advantages including, but not limited to, the following: (a) the Auto SET is self-compensating for temperature variations due to the similar thermal expansion rate of the stainless steel benchmark rod and stainless steel cable, (b) the Auto SET may be built to the specific range of site water levels present on most floodplains, (c) the Auto SET is sensitive to 0.04 mm of surface movement and its measurement rate allows detrending of data to find the true shallow subsidence rate, and (d) the accuracy of the Auto SET allows for the measurement of soil shrinkage due to daily evapotranspiration cycles.

It will be appreciated by those skilled in the art that modifications and variations of the present invention are possible without departing from the principles and spirit of the invention, the scope of which is defined in the appended claims and their equivalents.

General Bibliography on the Subject

The following bibliography provides citations to the references cited in the above text. The references are provided merely to clarify the description of the present invention and citation of a reference either in the bibliography below or in the specification above is not an admission that any such reference is "prior art" to the invention described herein.

Cahoon, D. R., J. W. Day, Jr., and D. J. Reed. 1999. The influence of surface and shallow subsurface soil processes on wetland elevation: a synthesis. Current Topics in Wetland Biogeochemistry 3:72-88.

Kroes, D. E. and Hupp, C. R. 2010. The effect of channelization on floodplain sediment deposition and subsidence along the Pocomoke River, Md.: Journal of the American Water Resources Association 46:686-699.

What is claimed is:

1. An automatic surface elevation table for measuring ground surface movements, comprising:
   a free-floating foot resting on a sediment surface;
   a benchmark rod passing through a center of the free-floating foot, a lower end of the benchmark rod extending into the sediment surface and an upper end extending above the sediment surface; and
   a water level recorder system attached to a top of the benchmark rod and to the free floating foot, the water level recorder system measuring movement of only the free-floating foot to determine ground surface movements over a period of time.

2. The automatic surface elevation table of claim 1, wherein the water level recorder system comprises:
   a water level recorder attached to the upper end of the benchmark rod;
   a double block pulley system having an upper end connected to the water level recorder and a lower end connected to the free-floating foot; and
   a counterweight attached to the upper end of the double block pulley system.

3. The automatic surface elevation table of claim 2, wherein the double block pulley system operates as a motion multiplier to provide a sensitivity of movement of about 0.04 mm.

4. The automatic surface elevation table of claim 1, further comprising a vented lower shroud wrapped around the benchmark rod and a vented upper shroud wrapped around the lower shroud, the lower shroud and the upper shroud shielding the benchmark rod from direct sunlight and providing venting to minimize heat expansion.

5. The automatic surface elevation table of claim 1, further
   comprising: a housing around the water level recorder system; and
   a frame to support the housing and stabilize the benchmark rod.

6. The automatic surface elevation table of claim 1, wherein the water level recorder system is free-floating on the benchmark rod.

7. An automatic surface elevation table for measuring ground surface movements, comprising:
   a free-floating foot resting on a sediment surface;
   a benchmark rod passing through a center of the free-floating foot, a lower end of the benchmark rod extending into the sediment surface and an upper end extending above the sediment surface; and
   a water level recorder system attached to the benchmark rod, comprising: a
   water level recorder attached to a top of the benchmark rod,
   a double block pulley system having an upper end connected to the water level recorder and a lower end connected to the free-floating foot, and
   a counterweight attached to the upper end of the double block pulley system,
   wherein, the water level recorder system measures movement of the free-floating foot to determine ground surface movements over a period of time.

8. The automatic surface elevation table of claim 7, wherein the counterweight exerts about 1.15 kg of lift on the free-floating foot.

9. The automatic surface elevation table of claim 7, wherein the double block pulley system operates as a motion multiplier to provide a sensitivity of movement of about 0.04 mm.

10. The automatic surface elevation table of claim 7, further comprising a vented lower shroud wrapped around the benchmark rod and a vented upper shroud wrapped around the lower shroud, the lower shroud and the upper shroud shielding the benchmark rod from direct sunlight and providing venting to minimize heat expansion.

11. The automatic surface elevation table of claim 7, further comprising: a housing around the water level recorder system; and a frame to support the housing and stabilize the benchmark rod.

12. The automatic surface elevation table of claim 7, wherein the water level recorder system is free-floating on the benchmark rod.

13. The automatic surface elevation table of claim 7, wherein a surface area of the foot is about 0.06 m$^2$.

14. The automatic surface elevation table of claim 7, wherein the foot exerts an effective downward pressure of about 1 g/cm$^2$ on the sediment surface.

15. The automatic surface elevation table of claim 7, further comprising a platform attached to a top of the benchmark rod on which is fitted the water level recorder system.

16. A method for measuring ground surface movements using an automatic surface elevation table, comprising:
    placing a free-floating foot on a sediment surface;
    passing a benchmark rod through a center of the free-floating foot and driving the benchmark rod into the sediment surface, an upper end of the benchmark rod extending above the sediment surface;
    attaching a water level recorder system to a top of the benchmark rod and to the free floating foot; and
    measuring vertical movement of the free-floating foot using the water level recorder system to determine ground surface movements over a period of time.

17. The method of claim 16, further comprising shielding the water level recorder system and the benchmark rod from direct sunlight to minimize heat expansion.

18. The method of claim 17, wherein said shielding the benchmark rod comprises wrapping a vented lower shroud around the benchmark rod and wrapping a vented upper shroud around the lower shroud, the lower shroud and the upper shroud shielding the benchmark rod from direct sunlight and providing venting to minimize heat expansion.

19. The method of claim 17, wherein said shielding the water level recorder system comprises enclosing the water level recorder system within a housing.

20. The method of claim 16, further comprising stabilizing the benchmark rod within a supporting and protective structure.

* * * * *